(12) United States Patent
Huh et al.

(10) Patent No.: US 7,778,655 B2
(45) Date of Patent: Aug. 17, 2010

(54) MOBILE COMMUNICATIONS TERMINAL FOR CONTROLLING USER'S FLOOR AND METHOD THEREOF

(75) Inventors: Kang-Suk Huh, Gyeonggi-Do (KR); Young-Ae Kim, Seoul (KR); Yong-Suk Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 1079 days.

(21) Appl. No.: 11/443,170

(22) Filed: May 31, 2006

(65) Prior Publication Data

US 2007/0019595 A1 Jan. 25, 2007

Related U.S. Application Data

(60) Provisional application No. 60/701,961, filed on Jul. 25, 2005, provisional application No. 60/735,196, filed on Nov. 10, 2005.

(30) Foreign Application Priority Data

Mar. 2, 2006 (KR) ...................... 10-2006-0020158

(51) Int. Cl.
*H04B 7/00* (2006.01)
*H04Q 7/20* (2006.01)

(52) U.S. Cl. .................... 455/519; 455/518; 455/414.1; 370/259

(58) Field of Classification Search ......... 455/518–521, 455/526, 72, 414.1, 414.3; 370/202, 259, 370/345, 490–495, 521, 529
See application file for complete search history.

(56) References Cited

U.S. PATENT DOCUMENTS

| | | | |
|---|---|---|---|
| 6,295,284 B1 * | 9/2001 | Maggenti | 370/328 |
| 6,898,436 B2 * | 5/2005 | Crockett et al. | 455/518 |
| 2003/0008657 A1 | 1/2003 | Rosen et al. | |
| 2003/0017836 A1 | 1/2003 | Vishwanathan et al. | |
| 2003/0235184 A1 * | 12/2003 | Dorenbosch et al. | 370/352 |
| 2006/0014556 A1 * | 1/2006 | Park et al. | 455/518 |
| 2006/0019692 A1 | 1/2006 | Huh et al. | |
| 2006/0126635 A1 * | 6/2006 | Alberth et al. | 370/395.2 |
| 2006/0153102 A1 * | 7/2006 | Kuure et al. | 370/263 |
| 2006/0171351 A1 * | 8/2006 | Wild et al. | 370/328 |
| 2007/0049314 A1 * | 3/2007 | Balachandran et al. | 455/518 |
| 2007/0105579 A1 * | 5/2007 | Shaffer et al. | 455/519 |
| 2008/0009281 A1 * | 1/2008 | Sung et al. | 455/426.1 |
| 2008/0020718 A1 * | 1/2008 | Jin et al. | 455/90.2 |

FOREIGN PATENT DOCUMENTS

EP 1 182 895 A1 2/2002

(Continued)

*Primary Examiner*—Sujatha Sharma
(74) *Attorney, Agent, or Firm*—Birch, Stewart, Kolasch & Birch, LLP (57) ABSTRACT

A mobile communications terminal, and method and system for controlling a floor during a PT session, are discussed. According to one aspect of the present invention, the terminal includes a PT client. The PT client includes a controller to request a user's confirmation of media burst for a PT session when the PT client receives a media burst confirmation request. The controller selectively starts encoding of media data of the PT session depending on the user's response to the controller's request.

16 Claims, 3 Drawing Sheets

FOREIGN PATENT DOCUMENTS

| | | |
|---|---|---|
| KR | 10-2004-0088440 A | 10/2004 |
| WO | WO 03/036801 A2 | 5/2003 |
| WO | WO 03/069926 A1 | 8/2003 |
| WO | WO 2006/043791 A1 | 4/2006 |
| WO | WO 2007/013730 A1 | 2/2007 |

* cited by examiner

MOBILE COMMUNICATIONS TERMINAL FOR CONTROLLING USER'S FLOOR AND METHOD THEREOF

This application claims the priority benefits of U.S. Provisional Application No. 60/701,961 filed on Jul. 25, 2005; U.S. Provisional Application No. 60/735,196 filed on Nov. 10, 2005; and Korean Patent Application No. 10-2006-0020158 filed on Mar. 2, 2006 in Republic of Korea. The entire contents of each of these applications are hereby fully incorporated by reference.

BACKGROUND OF THE INVENTION

1. Field of the Invention

The present invention relates to a session service based upon session initiation protocol (SIP), and particularly, to a mobile communications terminal for controlling a user's floor in a push-to (PT) service, and a method and system thereof.

2. Discussion of the Related Art

A PT service is intended to provide rapid communications for business and consumers of mobile networks. The PT service can be a Push-to-talk Over Cellular (PoC) or PTT (Push To Talk) service for providing a call service by sending voice data, a Push To View (PTV) for sending moving picture (video) data, or a communication service such as a Push To Data (PTD) for sending data. In a PT service system, a PT client (e.g., a client supporting a PT service) that wishes to transmit media data needs to first have an authority/permission to transmit the media data. Media data refers to voice, video, or data, or any combination thereof. Thus, prior to the actual transmission of the media data, the PT client that wishes to transmit the media data transmits a media burst request message to an associated PT server. A media burst is a right to send media data. If the PT service is a PTT or PoC service, then the media burst request message can be referred to as a talk burst request message.

Once the PT client receives the media burst (permission), then the PT client sends media data to one or more other PT clients with which a session has been established. The PT service allows user voice, moving picture and data communications to be shared with a single recipient (1-to-1) or between groups of recipients as in a group chat session (1-to-many), and uses a session initiation protocol (SIP) to establish a session.

In general, a PoC service is a half duplex communication service which is capable of immediately communicating with another party, and provides communications services based upon a circuit or a packet using technologies such as SIP, AD-hoc, or the like.

Users register their information in a PoC server to subscribe to the PoC service. The users registered in the PoC server (referred to as a PoC user hereafter), if necessary, form a certain group.

In one group including a plurality of PoC users, each PoC user selects (presses) a button on a PoC terminal to request a floor (or a talk burst). The PoC server grants the floor to the PoC user who has requested the talk burst and notifies the other PoC users that the floor is currently not available. Afterwards, when completing the transmission of media data, the PoC user selects the PoC button to release the floor. The other PoC users then request the floor from the PoC server to send desirable media data such as audio data and/or video data.

In the related art PoC service, in order to smoothly provide the PoC service, priority levels for a talk burst request are designated in the order of normal priority→high priority→pre-emptive priority. Accordingly, when a plurality of PoC users having different priorities request the talk burst, the PoC server grants the floor to the PoC user having the highest priority. But if a plurality of PoC users having the same priority request the talk burst (e.g., a right to speak), the PoC server grants the floor in the order in which the requests are made.

Figure 1:
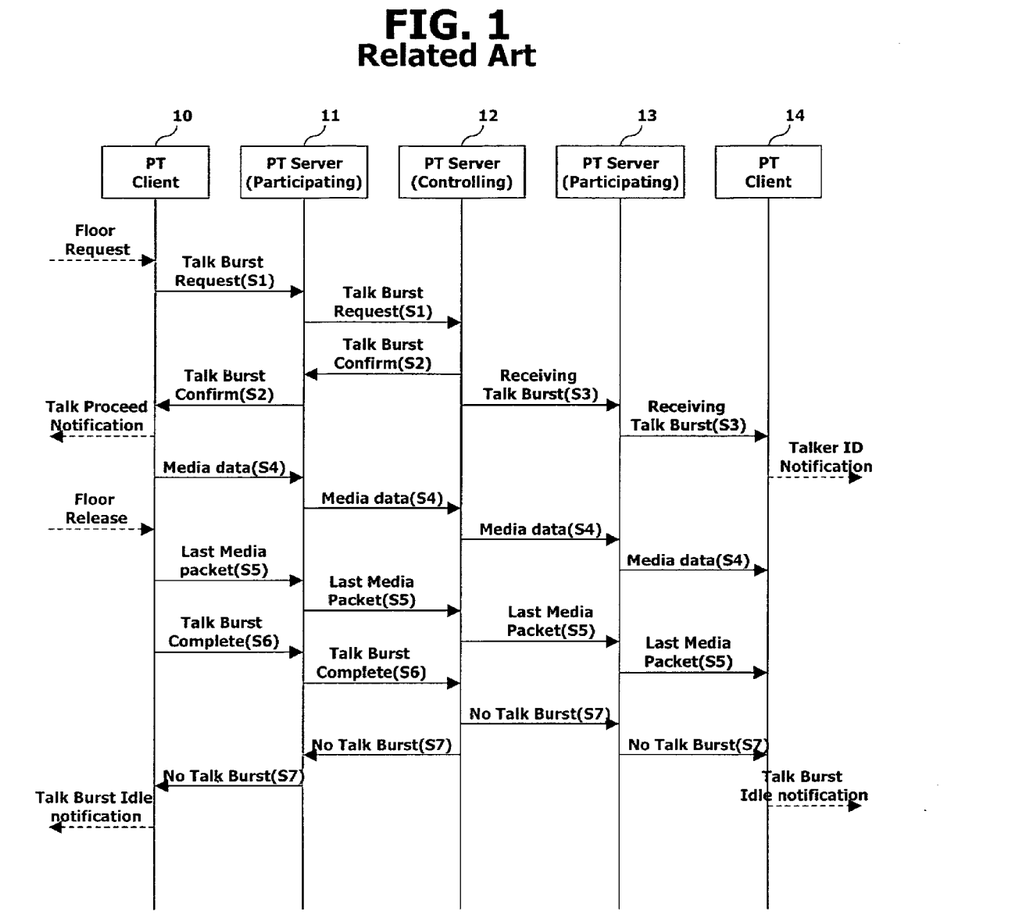
FIG. 1 is a diagram illustrating a procedure for controlling a floor when PoC users having the same priority request a floor according to a related art.

FIG. 1 illustrates a procedure for controlling a floor when PT users having the same priority request the floor. Here, as an example, an explanation will be given for PT clients 10 and 14, where the PT clients 10 and 14 function as PoC clients and users of the PT clients 10 and 14 are respectively referred to as PoC user A and PoC user B.

As illustrated in FIG. 1, when the PoC user A selects a PoC button, software mounted in the user A's PoC terminal, namely, the PT client 10, requests a floor from a PT server 12, which is a controlling server (server having a controlling function), using a talk burst request message (S1). Here, a PT server 11, which is a participating server (server having a participating function), is used to deliver messages and media data between the PT client 10 and the PT server 12.

The PT server 12 uses a talk burst confirm message to notify the PT server 11 of the grant of the floor in response to the talk burst request message, and the PT server 11 then sends the talk burst confirm message to the PT client 10 (S2). The talk burst confirm message is equivalent to a talk burst granted message. Through a PT server 13, the PT server 12 also sends a receiving talk burst message to inform other PoC clients (e.g., a PT client 14) on a PoC session that the PT client 10 currently has the floor (S3). Here, each PoC client, for example, the PT client 14 notifies the PoC user B of a user ID of the PT client 10.

The PT client 10 having received the talk burst confirm message informs the PoC user A that the floor has been granted thereto using a certain sound or a message, for example, and immediately and automatically starts to send media data (e.g., audio data or vide data) to the PT server 12 through the PT server 11 (S4). Accordingly, the PT server 12 sends the media data received from the PT client 10 via the PT server 13 to all of the other PT clients (e.g., PT client 14) on the PoC session.

Afterwards, when the PoC user A releases the PoC button on his terminal, the PT client 10 sends the last media packet to the other PT clients through the PT servers 11-13 (S5), and then uses a talk burst complete message to inform the PT server 12 that the PoC user A is finished (S6). The talk burst complete message is equivalent to a talk burst release message. When receiving the talk burst complete message, the PT server 12 uses a no talk burst message to inform all of the PT clients including the PT client 10 that no one has the floor (S7). Accordingly, each PT client including the PT client 10 notifies its PT client of a talk burst idle.

Figure 2:
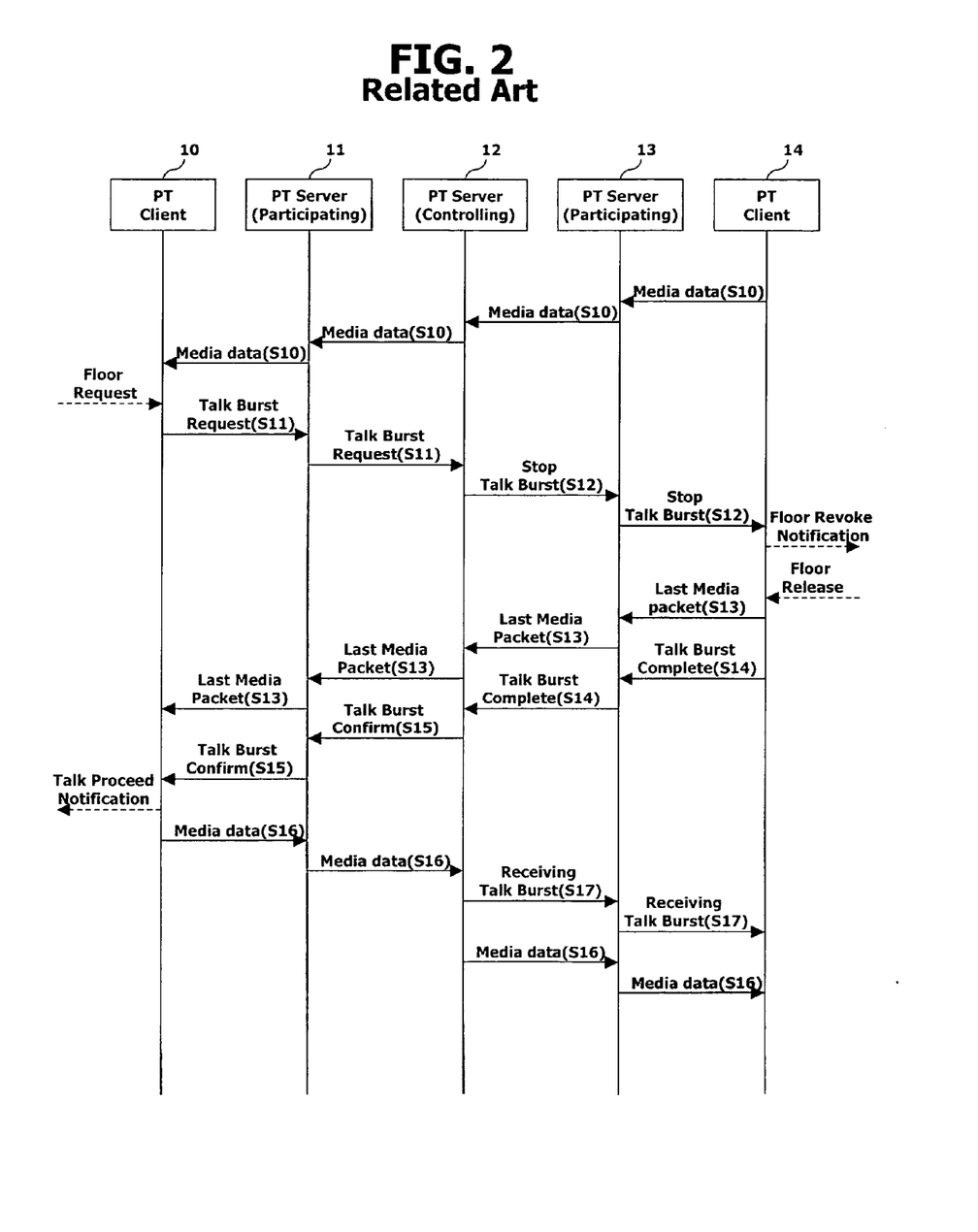
FIG. 2 is a diagram illustrating a procedure for controlling a floor when a PoC user having a pre-emptive priority requests a floor according to a related art.

FIG. 2 illustrates a general procedure for controlling a floor when PT users having different priorities request the floor, and in particular, a procedure for controlling the floor when a PoC user having the pre-emptive priority requests the talk bust authority.

As illustrated in FIG. 2, a current PT client 14 receives the floor from the PT server 12 and sends media data to all of the PT clients (e.g., PT client 10 and others) on the PoC session through the PT servers 11-13 (S10). Here, it is assumed that the PoC user A of the PoC client 10 has the highest pre-emptive priority.

In this state, when the PoC user A having the highest pre-emptive priority selects the PoC button, the PT client 10 sends a talk burst request message to the PT server 12 to request the floor from the PT server 12 (S11). Here, the talk burst request message includes information about the PoC user A having the highest pre-emptive priority.

Upon receiving the talk burst request message from the PT client 10 having the highest pre-emptive priority, the PT server 12 then sends a stop talk burst message to the PT client 14 to inform the PT client 14 which is currently sending the media data that the floor thereof would be cancelled (interrupted) (S12). Before interrupting the floor of the PT client 14, the PT server 12 permits the PT client 14 to take a particular grace time.

The PT client 14 sends the last media data to the PT client 10 during the grace time (S13), and thereafter sends a talk burst complete message to the PT server 12 to thereby release its floor (S14). The PT server 12 having received the talk burst complete message then sends a talk burst confirm message to the PT client 10 to inform the PT client 10 of the grant of the floor to the PT client 10 (S15).

Accordingly, the PT client 10 informs the PoC user A of the granted floor and immediately and automatically starts to send media data to the PT server 12 (S16). Upon receiving the media data, the PT server 12 sends a receiving talk burst message to the PT client 14 to inform the PT client 14 that the PT client 10 is sending the media data (S17). The PT server 12 then sends the received media data to the PT client 14 (S16).

Thus, while the PoC user B (the PT client 14) having the normal priority or the high priority has the floor or a right to send media data such as audio data or video data for one PoC session, when another PoC user A (the PT client 10) having the pre-emptive priority requests the talk burst, the PT server 12 interrupts the floor of the PoC user B having the normal or high priority by use of the stop talk burst message (S12), and then grants the floor to the PoC user A having the pre-emptive priority so that the PT client 10 can send its media data.

In this situation, because the floor of the PoC user B having the normal priority or the high priority is interrupted in a state of incompletely sending the media data, the floor is then granted back to the PoC user B when the PoC user A having the preemptive priority releases its floor. That is, when the PoC user A having the pre-emptive priority releases its floor, in the related art, the PT server 12 grants the floor back to the PoC user B whose floor has been interrupted by using a talk burst confirm message.

This, however, can create problems. For instance, even if the PoC user B whose floor has been interrupted does not request the floor and in fact another PoC user requests the floor, the PT server 12 preferentially grants the floor back to the PoC user B (the PT client 14). As a result, upon receiving the talk burst confirm message, the PT client 14 may send an indication to the PoC user B that the PT server 12 has granted the floor thereto, and then immediately and automatically sends its media data such as audio data (e.g., surrounding sounds including the user B's voice data) and video data, to the PoC server 12 without the permission of the PoC user B (i.e., without requiring an approval from the user B). That is, even if the PT client 14 did not request the floor, the floor is granted back to the PT client 14 and as a result, unexpected or undesired media data of the user B may be sent from the PT client 14 to the other terminals, which is highly undesired and problematic. Since the user B does not expect the grant-back of the floor after the user B's floor interruption, but the floor is still granted back to the user B, the user B's media data is transmitted to the other users without the user B's permission. For instance, the user B's terminal may automatically pick up its surrounding sounds (e.g., user's conversations, background noise, etc.) and transmit them to the other terminals, without the user B's awareness and/or permission, whereby the user's current conversions, etc. are unintentionally sent to the other terminals. This can cause embarrassment and negative consequences to the user B and the users at the receiving side.

Furthermore, because the automatic grant-back of the floor and the automatic transmission of unintended media data from the user B's terminal, the user B may now be charged for and has to pay for such transmission that the user B did not authorize. Similarly, the users on the receiving side may now be charged for and have to pay for receiving such media data.

Moreover, because the floor is automatically granted back to the user B, if another user requests the floor, then that user will not get the floor until the user B is finished with the floor. Thus, the floor is not granted to a user that actually requests the floor, which can cause an unnecessary delay and frustration for that user.

SUMMARY OF THE INVENTION

Therefore, an object of the present invention is to provide a mobile communications terminal, method and system, which are capable of effectively controlling a user's floor when a PT user receives a floor or a right to send media data regardless of his intention.

Another object of the present invention is to provide a terminal, system and method for providing a PT service, which address the limitations and disadvantages associated with the related art.

To achieve these and other advantages and in accordance with the purpose of the present invention, as embodied and broadly described herein, there is provided according to an aspect of the present invention a method for controlling a user's floor in a PT service comprising receiving a message indicating that a terminal client grants a transmission of media data from an entity for controlling a session, confirming from the user whether to send the media data before the client sends the media data when receiving the message, and determining by the client whether to send the media data according to the result of the user confirmation.

To achieve these and other advantages and in accordance with the purpose of the present invention, the present invention provide according another aspect a mobile communications terminal which can comprise a control entity for sending a message for granting a transmission of media data on one session, and a terminal client for receiving its user's confirmation for the media data transmission before sending the media data when receiving the message for granting the media data transmission from the control entity, and then determining whether to send the media data.

According to another aspect of the present invention, the session can be a Push-to (PT) session. The media data contains one or more of the following: audio, video, images, texts, and/or files. The media data can be Real-Time Protocol (RTP) data. The control entity can denote a control server when the message indicates a recovery of an interrupted floor. The control entity can denote a user having a right to control a floor with respect to other users taking part on the current session in case of a moderated PoC group service. The control entity can denote a user who has had a floor just before in case of a pre-granted media burst control service.

The terminal client may not send the media data when the result of the user confirmation is not received for a particular time duration or a user does not want to send the media. The message can be a talk burst (or media burst) confirm message. The talk burst confirm message can contain information indicating that a floor interrupted by a PT user having a pre-emptive priority is granted back to an original PT user. The information can indicate information related to a recovering from pre-emption. The terminal client can inform the user of the granting of the media data transmission only when the message contains the information related to the recovering of a floor. The terminal client can immediately send the media without a user's permission for the media data transmission when the user intends to request a talk burst before receiving the message. The user's intention can be determined by a terminal button in a pressed state, and it can be considered as a talk burst (or media burst) request when the corresponding button is on or enabled.

According to another aspect, the present invention provides a Push-to (PT) client comprising: a controller to request a user's confirmation of a media burst for a PT session when the PT client receives a media burst confirmation request, and to selectively start encoding of media data of the PT session depending on the user's response to the controller's request.

According to another aspect, the present invention provides a Push-to (PT) client comprising: a controller to generate a media burst confirmation request for a PT session with another PT client, and to send the generated media burst confirmation request to the another PT client, wherein the media burst confirmation request requests a confirmation of a media burst for the PT session from a user of the another PT client before media data can be sent from the another PT client for the PT session.

According to another aspect, the present invention provides a Push-to (PT) server comprising: a controller to generate a media burst confirmation request for a PT session of a PT client, and to send the generated media burst confirmation request to the PT client, wherein the media burst confirmation request requests a confirmation of a media burst for the PT session from a user of the PT client before media data can be sent from the PT client for the PT session.

According to another aspect, the present invention provides a Push-to (PT) system comprising: a device to generate and transmit a media burst confirmation request for a PT session; and a PT client to request a user's confirmation of a media burst for the PT session in response to the media burst confirmation request received from the device, and to selectively start encoding of media data of the PT session depending on the user's response to the request for the user's confirmation of the media burst.

According to another aspect, the present invention provides a method of controlling a floor of a Push-to (PT) session, the method comprising: requesting, by a PT client, a user's confirmation of a media burst for the PT session when the PT client receives a media burst confirmation request; and selectively starting, by the PT client, encoding of media data of the PT session depending on the user's response to the request for the user's confirmation of the media burst.

According to another aspect, the present invention provides a method of controlling a floor of a Push-to (PT) session, the method comprising: generating, by a PT client, a media burst confirmation request for the PT session with another PT client; and sending, by the PT client, the generated media burst confirmation request to the another PT client, wherein the media burst confirmation request requests a confirmation of a media burst for the PT session from a user of the another PT client before media data can be sent from the another PT client for the PT session.

According to another aspect, the present invention provides a method of controlling a floor of a Push-to (PT) session, the method comprising: generating, by a PT server, a media burst confirmation request for the PT session of a PT client; and sending, by the PT server, the generated media burst confirmation request to the PT client, wherein the media burst confirmation request requests a confirmation of a media burst for the PT session from a user of the PT client before media data can be sent from the PT client for the PT session.

According to another aspect, the present invention provides a method of controlling a floor of a Push-to (PT) session in a system including a device and a PT client, the method comprising: generating and transmitting, by the device, a media burst confirmation request for the PT session; requesting, by the PT client, a user's confirmation of a media burst for the PT session in response to the media burst confirmation request received from the device; and selectively starting, by the PT client, encoding of media data of the PT session depending on the user's response to the request for the user's confirmation of the media burst.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of the preferred embodiments of the present invention, with reference to the accompanying drawings.

In general, a Push-to (PT) service, which is based upon Session Initiation Protocol (SIP) for providing high speed communications to service providers and mobile communications terminal users, is a communication service in which one client for which a session has been set sends media data to one or more other clients. The present invention provides a terminal, system and method for providing such a PT service, which can be a Push to Talk (PTT) service for sending audio data, a Push to View (PTV) service for sending video data, or a Push to Data (PTD) service for sending data, or can be any service that performs a certain function by a pushing action of a user on the user's terminal.

The PT service grants communications between single recipients (1:1) or between recipient groups such as a group chat session, and uses the SIP for setting a session. A PT client using the PT service can communicate with other PT clients without performing a dialing process, a waiting process for a call connection and a call connection tone providing process. Accordingly, the PT client can provide a higher speed communication service over the conventional use of a mobile communication terminal.

According to the present invention, when a user taking part in a session receives a floor or a right to send data regardless of his intention during a SIP-based session service, the user's right to transmit media data can be controlled according to the result of the user's confirmation with respect to such media data transmission. The media data is Real-Time Protocol (RTP) data, which contains audio data, video data, images, texts, or files, or any combination thereof. A media burst is a right to send media data.

The method for controlling a floor according to the present invention can be applied, but is not limited, to the following cases.

In a first case, the present invention can be applied to a recovery of an interrupted floor in the PT service, namely, when a server grants the floor back to a specific user even if the specific user has not requested the floor. For example, when a user A having a pre-emptive priority interrupts a user B's floor and thereafter when the use of the floor of the user A having the pre-emptive priority is completed, the server grants the floor back to the user B even if the user B does not request the floor. In that case, according to the present invention, when the recovery of the interrupted floor is supported and the media data transmission permission is granted back to the interrupted PT client, the PT client shall get confirmation from its PT user before encoding and/or sending the media data.

That is, upon receiving by a PT client a talk/media burst granted/confirm message (which is a signal indicating a right of a terminal to send media data) from a PT server performing a controlling function, the present invention requires a user at the PT client to confirm or indicate the user's desire to take the floor back, and the PT client performs the encoding and transmission of media data only when the user has confirmed to take back the floor. The user's confirmation can be indicated in a variety of ways (e.g., Yes=data sending, No=impossible data sending).

In a second case, the present invention can be applied, in a moderated PT group service, to a case in which a user (=moderator) who has an ability (or a right) to control a floor of other users (or other PT participants) grants the right to send media data or the floor to other users. Here, the moderated PT group indicates a PT group in which a user (an authorized participant) on the moderated PT group can act as a moderator having an ability (or a right) to control the PT session of other users.

In this case, according to the present invention the PT client (of the moderator) shall indicate the right (media burst) to send media data to a PT user B but shall not start to encode and/or send any media data until the PT user B indicates that he wishes to send/receive media data. The media burst denotes requests from PT clients for obtaining a right to send media data including multimedia data. A mechanism for mediating such requests can be referred to as a media burst control. In addition, a talk burst denotes requests from the PT clients for obtaining a right to send talk burst data (e.g., voice/audio data), and a mechanism for mediating those requests can be referred to as a talk burst control.

In a third case, the present invention can be applied to a previously designated (granted) service such as a pre-granted media burst control service so as to allow a PT user to take the media burst alternately or sequentially or to allow the PT user to send data. That is, in the pre-granted media burst control service, when the floor granted to the PT user A is released, the floor is immediately granted to the next user, e.g., PT user B, without the permission from the PT server. Therefore, when the pre-granted service is involved, according to the present invention the PT client shall get confirmation from the PT user B before encoding and/or sending the media data.

In a fourth case, the present invention can be applied to a case in which a floor is granted to a PT user after a certain time elapses from a time when the PT user has requested the media burst. In this case, according to the present invention, the PT client confirms from the PT user whether to send media data, and selectively performs the encoding of data and/or the sending of the media data according to the result of the confirmation. If the PT user authorizes the encoding and/or transmission of the media data, then and only then the PT client will take the floor and encode and transmit the media data.

In the first through fourth cases, the floor may be granted by the PT server, but until an appropriate user confirms to take the floor, encoding and transmission of media for that user do not occur. In particular, the second and third cases indicate that the PT user B receives a media burst granted (which is a signal indicating a right of a terminal to send media data) from the specific user A having a right to grant the floor. That is, in the second and third cases, a media burst confirm message may be generated and sent from one user (client) to another user (client). Here, the PT user B can selectively perform the encoding of data and the sending of media data (RTP data) according to the user's permission.

Furthermore, the method for controlling the user's floor in accordance with the embodiments of the present invention can be implemented by using a mobile communications terminal. The mobile communications terminal includes a control entity for sending a message for granting a transmission of media data to another terminal/server, and a terminal client for receiving its user's confirmation for the transmission of the media data and then determining whether to send the media data on the user's confirmation before the media data can be sent, when the terminal receives a message that grants a transmission of media from another terminal/server.

Figure 3:
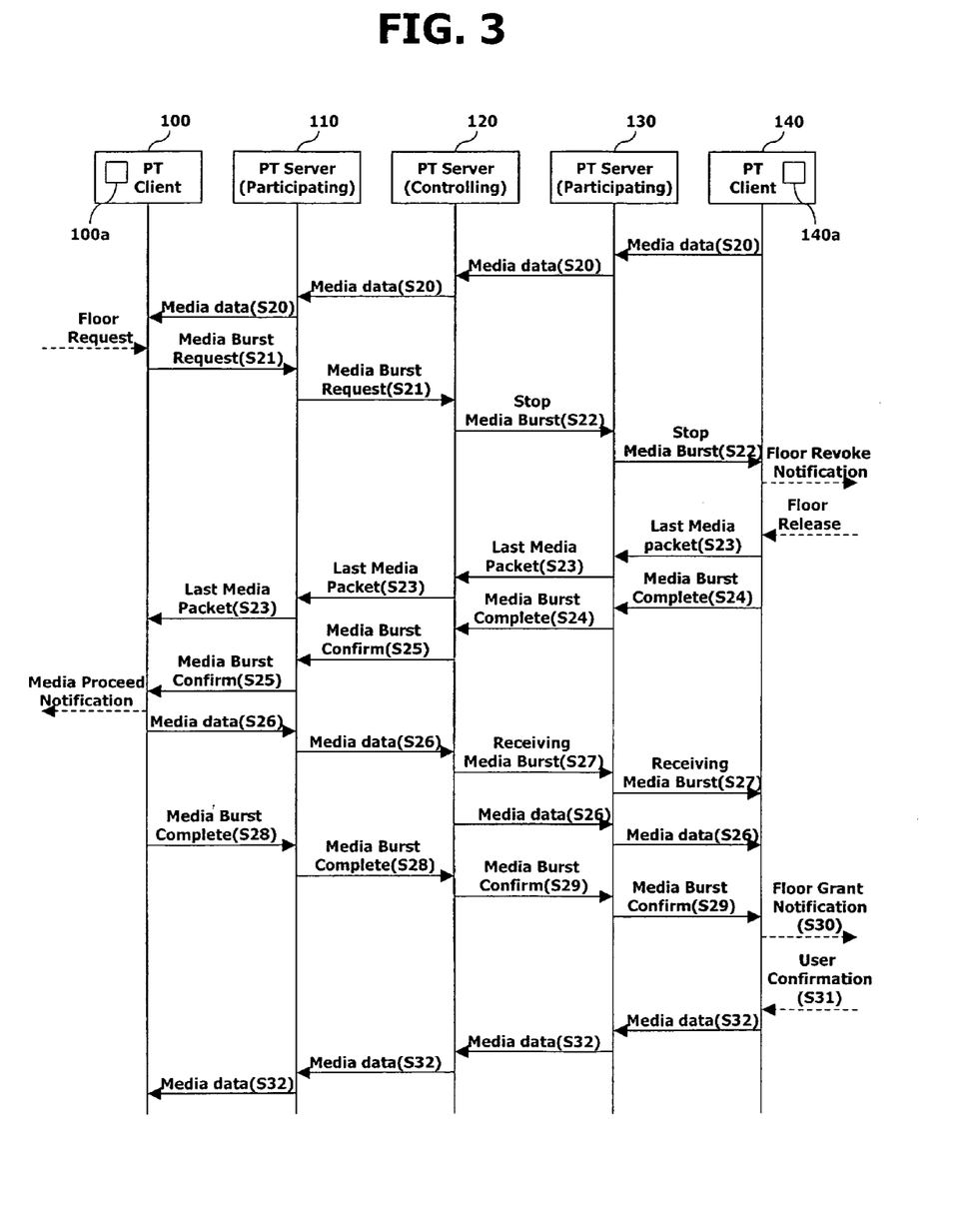
FIG. 3 is a diagram illustrating a system and procedure for controlling a floor when a PT user having a pre-emptive priority requests a floor in accordance with an embodiment of the present invention.

FIG. 3 is an exemplary view illustrating a system and procedure for controlling a floor for a PT user having a different priority in accordance with an embodiment of the present invention. Particularly, this procedure is for controlling the floor when a PT user having a pre-emptive priority requests the floor, as an example.

As shown in FIG. 3, the system includes a plurality of PT clients (in respective terminals) such as first and second PT clients 100 and 140, and a plurality of PT servers 110, 120, 130, all operatively configured. Each of the PT clients such as the clients 100 and 140 or each terminal associated with each PT client includes at least one controller/processor 100*a* or 140*a*. Each terminal also includes other components known in the related art terminals or the like such as a user input unit, a display unit, an audio unit, a network interface, etc.

Referring to FIG. 3, during one PT session (e.g., a PTT session, a PTV session, a PTD session, etc.), while a PT user B (or a PT client 140) having a normal priority or a high priority has a floor or a right to send media data and thus sends media data (S20), if a PT user A having a pre-emptive priority requests the floor, then the PT client 100 (PT client for the PT user A) sends a media burst request message (e.g., talk burst request message) to the PT server 120 through the PT server 110 so as to request the floor from the PT server 120 (S21). The PT server 120 then sends a stop media burst message (e.g., stop talk burst message) to the PT client 140 through the PT server 130 so as to inform the PT client 140 that the floor thereof would be interrupted (canceled) (S22).

The PT client 140 having received the stop media burst message sends the last media packet (S23) to the PT client 100, and then sends a media burst complete message (e.g., talk burst complete message) indicating a release of the floor, to the PT server 120 (S24). The PT server 120 sends the received last media packet to each PT client involved in the current PT session, and then sends a media burst confirm message (e.g., talk burst confirm message) to each of the involved PT clients so as to inform each PT client that the floor has been granted to the PT client 100 (S25).

Hence, the PT client 100 notifies the PT user A that the floor has been granted to the user A and then immediately starts to send its media data to the PT server 120 (S26). The PT server 120 sends a receiving media burst message (e.g., receiving talk burst message) to the PT client 140 so as to notify the PT client 140 that the PT client 100 is currently sending the media data (S27), and sends the received media data to the PT client 140.

Afterwards, upon completely sending all of the media data, the PT client 100 sends a media burst complete message (e.g., talk burst complete message) to the PT server 120 so as to notify the PT server 120 of the completion of the sending of the media data (S28).

Then the PT server 120 delivers a media burst confirm message (e.g., talk burst confirm message) to the PT client 140 of which floor has been interrupted and thereby grants the floor back to the PT client 140 (PT user B) (S29). Here, the media burst confirm message not only indicates that the PT server 120 grants the floor to the PT user B, but also contains information (e.g., information related to recovering from pre-emption) indicating that the floor interrupted and taken by the PT user A having the pre-emptive priority is now granted back to the PT user B. In other cases, the media burst confirm message may be sent from another user associated with another PT device, for instance, in the examples of the second and third cases (moderated PT group service and pre-granted service) discussed above.

The PT user B (or the PT client 140) checks whether the information related to recovering from pre-emption is contained in the received media burst confirm message at step S29. If such information is contained in the media burst confirm message, the PT client 140 notifies the PT user B that the floor has been granted thereto, e.g., by sounds, displays, etc. (S30). At this time, the PT client 140 checks whether the PT user B intends to take back the floor (S31). This checking can be determined by examining a pressed state of a button on the mobile terminal. There are a variety of different ways in which the user B can indicate or input the user B's intention of taking the floor, e.g., by selecting a menu button or other switch, voice activation, etc.

If (and only if) the user B has confirmed or indicated that the user B will accept the grant of the floor (e.g., the terminal button is on or enabled) (S31), then the PT client 140 immediately sends its media data to the PT server 120 (S32). If the user B does not confirm or indicate that the user will accept the floor (e.g., terminal button is not on or disabled or no response for a certain time duration), on the other side, the PT client 140 can again notify the user B of the grant for the floor (i.e., a floor grant) as aforementioned and simultaneously start to operate a timer.

Afterwards, the PT user B of the PT client 140 can indicate whether or not the PT user B accepts the media burst within a set time of the timer. If the PT user B gives the permission to encode and/or send its media data within the corresponding set time at step S31, the PT client 140 then starts to encode and/or send the media data to the PT server 120 (S32). However, if it is not confirmed whether the PT user B accepts the floor within the corresponding set time, then the PT client 140 can deliver a message indicating that the PT user B does not intend to take the floor to the PT server 120, at which point the PT server 120 can allow another PT user to have the floor.

If the media burst confirm message having received from the PT server 120 at step S29 does not contain the information related to recovering from pre-emption, the PT client 140 may only notify the PT user B that the floor has been granted thereto and then immediately start to send the media data to the PT server 120.

In the embodiment of FIG. 3 according to the present invention, the PT server 120 has sent the media burst confirm message containing the information related to recovering from pre-emption for granting the interrupted floor back to the PT client 140. However, it is not limited thereto. Accordingly, a new message for recovering from pre-emption can be generated and directly sent from the PT server 120 (or another PT client) to the PT client 140.

In addition, in the embodiment of FIG. 3 according to the present invention, the timer is started when the PT client 140 notifies the PT user B that the floor has been granted thereto. In a variation, instead, the PT server 120 can start the timer as soon as it sends the media burst confirm message to the PT client 140 at step S29. Here, the PT client 140 having received the media burst confirm message can confirm from the PT user B whether or not to send the media data. The PT client 140 then selectively performs the encoding of data and/or the transmission of the encoded data according to the user's confirmation/indication.

The PT server 120 checks whether the media data has been received from the PT client 140 within the set time of the timer. If the media data is received within the set time, the PT server 120 sends the received media data to each PT client. Otherwise, the PT server 120 considers all of the PT clients as an idle state.

Referring to FIG. 3, the present invention has been explained for a case where a floor interruption occurred due to a user having a preemptive priority. However, it should be understood that the present invention is equally applied to any case in which a floor is granted to a user without a user's awareness/permission.

According to the present invention, the terminal is generally a mobile terminal, but is not limited thereto. Examples of the terminal can be, but not limited to, a mobile phone, a UE (user equipment) for UMTS or the like, an MS (mobile station) for GSM or the like, a laptop computer, a PDA (personal digital assistant), various types of mobile terminals connected through the WLAN or other network, etc.

The methods of the present invention can be implemented in part by using existing computer programming language. Such computer program(s) may be stored in portable or other types of storages or memories such as hard drive, RAM, ROM, PROM, etc. associated with one or more computers or computer-based devices. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

As described above, in a PT service, if a specific user receives a floor or a right to send media data regardless of his intention, the media data (e.g., audio, video and/or images and/or texts and/or files) is selectively sent according to the result of the confirmation for the transmission of the media data by the corresponding user, thereby preventing information from or around that user from being exposed to other users, without the user's authorization. As a result, even if the user receives the floor or the right to send data regardless of his intention, undesirable media data is not generated or sent and thus overcharging caused by the sending of the unexpected media can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of half duplex communications between a first terminal and a second terminal via a server, the method performed by the first terminal and comprising:
    receiving, from the server, a stop media burst message indicating that an ongoing media data transmission to the server should be stopped for the first terminal that was granted a floor;
    transmitting, to the server, a last media packet after receiving the stop media burst message;
    transmitting, to the server, a media burst complete message that indicates a release of the floor for the first terminal after the last media packet is transmitted;
    receiving, from the server, a media burst message to notify that the floor has been granted to the second terminal;
    receiving, via the server, media data sent from the second terminal;
    receiving, from the server, a media burst confirm message indicating that the floor previously granted to the second terminal has been granted back to the first terminal;
    receiving, from a user of the first terminal, a confirmation that said user intends to resume the previously ongoing media data transmission to the server; and
    transmitting, to the server, media data according to the floor granted back to the first terminal.

2. The method of claim 1, wherein the second terminal has a pre-emptive priority that is a higher priority than that of the first terminal.

3. The method of claim 1, wherein a floor revoke notification procedure and a floor release procedure are performed after receiving the stop media burst message but prior to transmitting the last media packet.

4. The method of claim 1, wherein the confirmation is received according to at least one of a pressed state of a button on the first terminal, a user menu selection, and user voice commands.

5. The method of claim 1, wherein if the confirmation is not received within a certain period of time, the user is notified again that confirmation is being requested and a timer is operated to await the user's confirmation.

6. The method of claim 5, wherein if the confirmation is not received upon a lapse of the timer, the first terminal sends to the server a message that the user does not intend to resume the previously ongoing media data transmission.

7. The method of claim 1, wherein the media data includes at least one of audio data, video data, text data, multimedia data, and real time protocol (RTP) data.

8. The method of claim 1, wherein the ongoing media data transmission employs a PT session that comprises at least one of a PTT (Push-to-Talk) session, a PTV (Push-to-View) session, and a PTD (Push-to-Data) session.

9. A method of half duplex communications between a first terminal and a second terminal via a server, the method performed by the server and comprising:
    sending, to the first terminal, a stop media burst message indicating that an ongoing media data transmission to the server should be stopped for the first terminal that was granted a floor;
    receiving, from the first terminal, a last media packet after receiving the stop media burst message;
    receiving, from the first terminal, a media burst complete message that indicates a release of the floor for the first terminal after the last media packet is transmitted;
    sending, to the first terminal, a media burst message to notify that the floor has been granted to the second terminal;
    sending, to the first terminal, media data sent to the server from the second terminal;
    sending, to the first terminal, a media burst confirm message indicating that the floor previously granted to the second terminal has been granted back to the first terminal; and
    receiving, from the first terminal, media data according to the floor granted back to the first terminal, wherein a user of the first terminal provided a confirmation that said user intends to resume the previously ongoing media data transmission to the server.

10. The method of claim 9, wherein the second terminal has a pre-emptive priority that is a higher priority than that of the first terminal.

11. The method of claim 9, wherein a floor revoke notification procedure and a floor release procedure are performed by the first terminal after sending the stop media burst message but prior to transmitting the last media packet.

12. The method of claim 9, wherein the confirmation is provided by the user of the first terminal according to at least one of a pressed state of a button on the first terminal, a user menu selection, and user voice commands.

13. The method of claim 9, wherein if the confirmation is not provided within a certain period of time, the user is notified again that confirmation is being requested and a timer is operated to await the user's confirmation.

14. The method of claim 13, wherein if the confirmation is not provided upon a lapse of the timer, the server receives from the first terminal a message that the user does not intend to resume the previously ongoing media data transmission.

15. The method of claim 9, wherein the media data includes at least one of audio data, video data, text data, multimedia data, and real time protocol (RTP) data.

16. The method of claim 9, wherein the ongoing media data transmission employs a PT session that comprises at least one of a PTT (Push-to-Talk) session, a PTV (Push-to-View) session, and a PTD (Push-to-Data) session.

* * * * *